United States Patent
Kamenov (10) Patent No.: US 12,440,905 B2
(45) Date of Patent: Oct. 14, 2025

(54) MILLING BIT WITH SPHERICAL ENDING FOR CNC MILLING OF INDUSTRIAL CLAY

(71) Applicant: Kamen Petrov Kamenov, Sofia (BG)

(72) Inventor: Kamen Petrov Kamenov, Sofia (BG)

(73) Assignee: Kamen Petrov Kamenov, Sofia (BG)

( * ) Notice: Subject to any disclaimer, the term of this patent is extended or adjusted under 35 U.S.C. 154(b) by 168 days.

(21) Appl. No.: 17/668,302

(22) Filed: Feb. 9, 2022

(65) Prior Publication Data
US 2022/0266357 A1  Aug. 25, 2022

Related U.S. Application Data

(63) Continuation of application No. PCT/IB2020/057379, filed on Aug. 5, 2020.

(30) Foreign Application Priority Data

Aug. 9, 2019 (EP) ..................................... 19472001

(51) Int. Cl.
B23C 5/10 (2006.01)

(52) U.S. Cl.
CPC ........ B23C 5/1009 (2013.01); *B23C 2210/04* (2013.01); *B23C 2210/0457* (2013.01);
(Continued)

(58) Field of Classification Search
CPC .......... B23C 5/1009; B23C 2210/0457; B23C 2210/201; B23C 2210/64;
(Continued)

(56) References Cited

U.S. PATENT DOCUMENTS

| 43,673 A | * | 8/1864 | Dudgeon | B23B 51/108 407/30 |
| 1,717,736 A | * | 6/1929 | Salstrom | B44B 3/06 144/219 |

(Continued)

FOREIGN PATENT DOCUMENTS

| CN | 101386080 A | * | 3/2009 | ............... B23C 5/10 |
| CN | 104368859 A | * | 2/2015 | |

(Continued)

OTHER PUBLICATIONS

Tool and Manufacturing Engineers Handbook, vol. 1; Drozda et al.; Chapter 10 (1983).*

(Continued)

*Primary Examiner* — Ryan Rufo
(74) *Attorney, Agent, or Firm* — Carlson, Gaskey & Olds, P.C.

(57) ABSTRACT

An example milling bit comprises a shank and a working sector comprising a cutting anterior part, which is a portion of a hollow sphere, a cutting posterior part fixed to the shank and located between the shank and the spherical anterior part, at least one cutting tooth extending along an entire length of the working sector with a cutting edge, and at least one flute to the cutting tooth extending along length of the working sector following the path of the cutting edge. The spherical anterior part of the working sector is hollow and at least one cutting tooth in the anterior cavity region has a shape of a spherical shell element.

17 Claims, 12 Drawing Sheets

(52) U.S. Cl.
CPC ............. *B23C 2210/0485* (2013.01); *B23C 2210/084* (2013.01); *B23C 2210/201* (2013.01); *B23C 2210/202* (2013.01); *B23C 2210/241* (2013.01); *B23C 2210/246* (2013.01)

(58) Field of Classification Search
CPC ........ B23C 2210/0485; B23C 2230/00; B23C 2230/04; B23C 2230/045; B23C 2230/08; B27G 13/002
See application file for complete search history.

(56) References Cited

U.S. PATENT DOCUMENTS

| | | | | |
|---|---|---|---|---|
| 2,107,787 | A * | 2/1938 | Grumke | B44B 3/06 |
| | | | | 144/219 |
| 2,202,251 | A * | 5/1940 | Gille | B27G 13/12 |
| | | | | 144/219 |
| 3,491,651 | A * | 1/1970 | George | B26F 3/06 |
| | | | | 83/171 |
| 4,265,282 | A * | 5/1981 | Lenz | B27G 13/002 |
| | | | | 407/54 |
| 4,595,321 | A * | 6/1986 | Van Dalen | B23B 51/04 |
| | | | | 408/205 |
| 4,754,787 | A * | 7/1988 | Smith | B27G 15/00 |
| | | | | 82/158 |
| 5,685,671 | A * | 11/1997 | Packer | B23C 5/1081 |
| | | | | 407/54 |
| 6,234,725 | B1 | 5/2001 | Campian | |
| 7,226,249 | B2 * | 6/2007 | Tsuchitani | B23C 5/1036 |
| | | | | 407/42 |
| 7,780,379 | B2 * | 8/2010 | Turrini | B23C 5/10 |
| | | | | 407/53 |
| 8,366,354 | B2 * | 2/2013 | Davis | B23C 5/10 |
| | | | | 407/53 |
| 10,189,134 | B2 * | 1/2019 | Brigolin | B23C 5/16 |
| 10,617,430 | B2 * | 4/2020 | O'Sullivan | B23C 5/10 |
| 2005/0133277 | A1 | 6/2005 | Dixon | |
| 2009/0022561 | A1 * | 1/2009 | Winebrenner | B23B 51/02 |
| | | | | 408/230 |
| 2009/0053674 | A1 * | 2/2009 | Danger | A61C 3/02 |
| | | | | 433/102 |
| 2010/0172703 | A1 * | 7/2010 | Neubold | B23C 5/10 |
| | | | | 407/53 |
| 2011/0211922 | A1 | 9/2011 | Maeda et al. | |
| 2014/0277041 | A1 | 9/2014 | Manley et al. | |
| 2016/0107264 | A1 | 4/2016 | Kondameedi et al. | |

FOREIGN PATENT DOCUMENTS

| | | | | |
|---|---|---|---|---|
| CN | 207239249 | U * | 4/2018 | |
| DE | 485867 | C * | 11/1929 | |
| DE | 9318547 | U1 * | 4/1994 | |
| EP | 0043771 | A2 * | 1/1982 | ............... B26F 1/16 |
| FR | 667469 | A * | 10/1929 | |
| GB | 1232440 | A | 5/1971 | |
| JP | 05253725 | A * | 10/1993 | |
| JP | H08168913 | A * | 7/1996 | |
| JP | H10263913 | A * | 10/1998 | |
| JP | H10263914 | A * | 10/1998 | |
| JP | 2006198767 | A * | 8/2006 | ............. B23C 5/003 |
| KR | 20150041850 | A * | 4/2015 | |
| WO | WO-2010050388 | A1 * | 5/2010 | ............. B23B 51/02 |
| WO | WO-2014030623 | A1 * | 2/2014 | ............... B23C 5/10 |

OTHER PUBLICATIONS

Translation JP 05-253725 A obtained at https://patents.google.com/patent/JPH05253725A/en?oq=jP+05253725 (last visited Aug. 24, 2023).*

Description DE485867 C (translation) obtained at https://worldwide.espacenet.com/ (last visited Feb. 16, 2024).*

Description CN101386080A (translation) obtained at https://worldwide.espacenet.com/ (last visited Oct. 18, 2024).*

Description JP2006198767A (translation) obtained at https://worldwide.espacenet.com/ (last visited Oct. 18, 2024).*

International Search Report and Written Opinion for PCT IB2020/057379 mailing date of Nov. 19, 2020.

* cited by examiner

FIG. 13

MILLING BIT WITH SPHERICAL ENDING FOR CNC MILLING OF INDUSTRIAL CLAY

CROSS-REFERENCE TO RELATED APPLICATIONS

This application is a continuation of International Application No. PCT/IB2020/057379, filed on Aug. 5, 2020, which claims priority to EP19472001.7, filed on Aug. 9, 2019, the disclosures of each of which are incorporated by reference herein in their entirety.

TECHNICAL FIELD

This disclosure relates to rotating cutting tools and more specifically to milling bits with a spherical end and one or more cutting edges designed for cutting industrial clay.

BACKGROUND

Computerized Numerical Control ("CNC") milling is a technology widely used in the field of automotive design, as well as in other areas of transportation and product design. This process allows computer generated three-dimensional virtual models to materialize in full size by milling massive blocks of industrial clay. Industrial clay changes its physical characteristics in accordance with the temperature, from a soft plastic mass when heated to a state similar to hardened chocolate at room temperature. World automotive manufacturers use a vast quantity of clay milling equipment and rely on this technology for the manufacture of physical models with a high level of detail and realism. These models are of paramount importance for making the right design decisions when developing new models. Any improvement in the technique and efficiency of digital milling will have a positive and snowball effect on the overall process of developing and manufacturing automotive models, and accordingly, on the production of the final product.

Current technology used on industrial clay is comparable to that used for cutting harder materials. Clay milling machines are equipped with milling bits similar to the ones used with a traditional configuration. They function acceptably when milling industrial clay, but are not geometrically optimized according to the specific material, thus limiting their potential. The results are satisfactory at the standard low cutting speed, but a significant decrease in quality is observed with a growth in the rotation speed and feed rate of the milling bit. The intensification of the cutting leads to an increase in resistance, appearance of resonant vibrations and melting of the working surface of the thermoplastic clay from heat generated due to the rising friction. Melting the clay also causes adhesion and accumulation of material on the milling bit, which worsens the above problems. As a result, the quality of the milling surface is degraded.

A milling bit for industrial clay is shown in DE19815269A1, with a cylindrical rod and a cutting part, which has a central hole that allows the passage of chips, and the cutting part is formed by two opposite cutting blades forming a ring. In this tool, the working area is limited only by the annular cutting part while the rod is not involved in cutting. In addition, the cutting edges are laid in the same plane perpendicular to the cutting direction, which unfavorably increases the cutting load and creates the potential for vibration of the tool.

Another milling bit for soft materials is also shown in GB1232440A with a similar construction to DE19815269A1.

SUMMARY

According to one aspect of the present disclosure, a milling bit is provided with a spherical ending that can form blocks of industrial clay into models by removing material in a stable and efficient way, with improved speed and surface quality regardless of changing cutting conditions. The improvement is achieved due to the specific geometry of the milling bit, which is adapted to the characteristics of the milling material.

In one embodiment, a milling bit for soft materials includes a shank and a working sector. The working sector comprises a cutting anterior part, which is a portion of a sphere, and a cutting posterior part fixed to the shank and located between the shank and the spherical anterior part. The working sector further comprises at least one cutting tooth extending along the entire length of the working sector, with a cutting edge, that is formed as a projection of a helicoid on the surface of the working sector and ends at the point of intersection of the milling bit's axis and the frontal spherical surface of the anterior part, forming a helix with a helicoidal angle of 10°-45°, preferably from 20° to 35°. The working sector further comprises at least one flute to the cutting tooth extending along the length of the working sector following the path of the cutting edge.

In another embodiment according to any of the previous embodiments, at least the spherical anterior part of the working sector is hollow, and an open anterior cavity is formed by an inner surface of the at least one cutting tooth such that the anterior cavity region has the shape of a spherical shell with a wall thickness from 0.3 mm to 5 mm.

In another embodiment according to any of the previous embodiments, a wedge angle $\beta$ is between 3°-40° at the anterior end of the cutting tooth.

In another embodiment according to any of the previous embodiments, the rake angle $\theta$ of the cutting tooth is between 45°-87° in at least the anterior part of the working sector.

In another embodiment according to any of the previous embodiments, the shape of the revolved surface described by at least one cutting edge of a cutting tooth at the posterior part of the working sector is cylindrical, conical, paraboloid, hyperboloid or a combination of the above.

In another embodiment according to any of the previous embodiments, the cavity in the anterior part of the working sector extends partially to the posterior part of the working sector.

In another embodiment according to any of the previous embodiments, the anterior cavity is spherical, spheroidal, ellipsoidal, ovoid or other similar rotational shape.

In another embodiment according to any of the previous embodiments, the diameter of the anterior part of the working sector is the same (inscribed) as the diameter of the posterior part, and the anterior part is a hemisphere.

In another embodiment according to any of the previous embodiments the diameter of the anterior part of the working sector is larger than the diameter of the posterior part.

In another embodiment according to any of the previous embodiments, the anterior part of the working sector has one cutting tooth, which is formed as a spherical shell element representing a segment of a hollow sphere with an angular arc width $\alpha$ from 45° up to 180°, or more narrowly from 60° to 180° in the Equatorial plane.

In another embodiment according to any of the previous embodiments, the angular arc width $\alpha$ of the spherical shell element is 90° to 180° in the Equatorial plane, and an additional through hole is provided in the wall of the spherical shell element.

In another embodiment according to any of the previous embodiments, there are two diametrically opposite identical cutting teeth, which in the anterior part of the working sector have the form of spherical shell elements representing segments of a hollow sphere with an angular arc width α from 10° to 90° in the Equatorial plane.

In another embodiment according to any of the previous embodiments, the milling bit has three identical cutting teeth symmetrically arranged with respect to the Central axis of the milling bit, which in the anterior part of the working sector have the form of spherical shell elements representing segments of a hollow sphere with an angular arc width α from 10° to 45 in the Equatorial plane.

Resistance when machining clay is the result of wedging and cutting action of the cutting edges and the friction between deflective surfaces of the milling bit and the clay. Resistance exerted on the milling bit from the clay is proportional to the strength (toughness and hardness) of the clay and depends directly on the size and geometry of the milling bit, the speed of rotation and feed of the tool. With industrial clay being a plastic material, cut off chips of clay have a tendency to adhere to deflective surfaces of a milling bit and drag. This effect amplifies parasitic resistance and results in negative consequences.

The present invention reduces cutting resistance, and consequently vibration and heat generation, by changing the geometry of the milling bit. This can improve the speed and quality of cutting and hence the productivity of the entire process.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of the disclosed examples will become apparent to those skilled in the art from the detailed description. The figures that accompany the detailed description can be briefly described as follows.

All figures from 3 to 13 are presented with three side views at different axial rotation. For milling bits with one or two cutting teeth (FIGS. 3-6, 8-10 and 13), view B is rotated 120° relative to the view A, and view C is rotated 240° relative to view A. For milling bits with three teeth (FIGS. 7 and 12), the rotation angle between views A, B and C is 45°. Views D and E for each figure show schematic cross-sections of the milling bit in the anterior part and posterior part of the working sector, respectively. View F is an enlarged frontal axial view of the milling bit with magnification 1:1.7 relative to views A, B, C.

DETAILED DESCRIPTION

Figure 1:
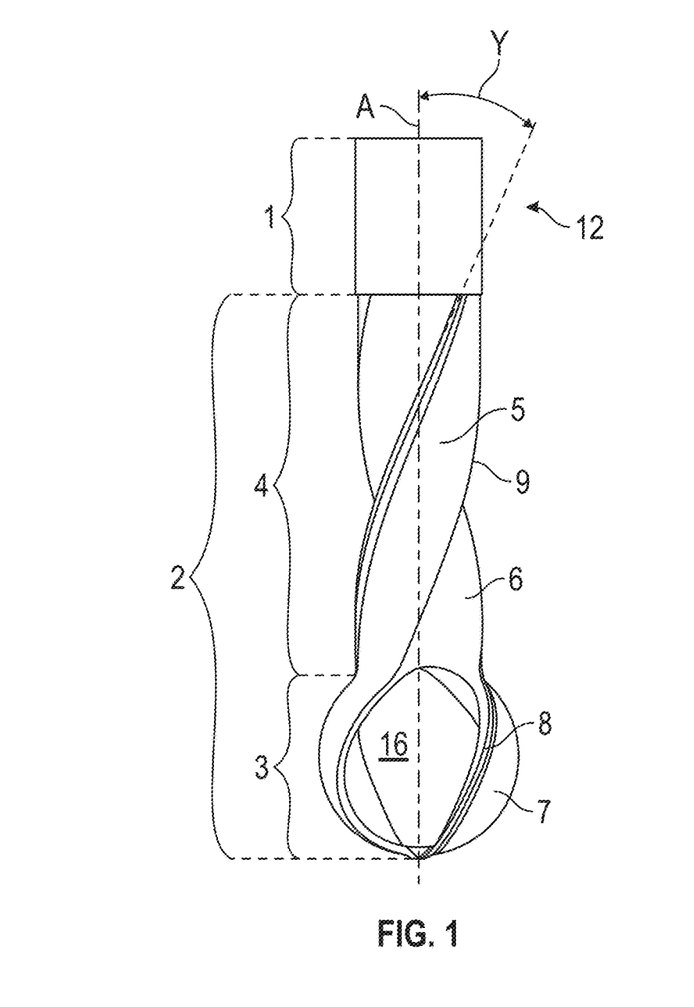
FIG. 1 presents an example milling bit 12 in order to indicate the main parts of the tool design. The figure also shows the helicoidal angle γ of the helicoid curve, which forms the cutting edge 8 of the cutting tooth 5.

FIG. 1 shows an improved milling bit 12 according to one example of the disclosure. The milling bit 12 is a rotary cutting tool with one or more cutting teeth 5. The milling bit 12 includes two integrally attached sections, a shank 1 and a working sector 2, oriented on a single central axis of rotation A as follows:

The shank 1 is a solid rod, that may be cylindrical or another shape, and serves to secure the tool in the chuck of a milling machine. The diameter of the shank 1 may be larger or smaller than the diameter of the working sector 2.

Working sector 2 is fixed to the shank 1. It has one or more longitudinal cutting teeth 5 with cutting edges 8 that are helicoidal around the axis of rotation A and, accordingly, one or more flutes 6. The term "helicoidal cutting edge" in this description means a cutting edge, which is formed as a projection of a helicoid on the surface of the working sector and ends at the intersection of the milling bit's axis A and the front spherical surface of an anterior part 3. In one example, the milling 12 has a helicoidal angle γ from 10° to 45°, more narrowly from 20° to 35° (FIG. 1). The helicoidal angle γ is defined between the cutting edge 8 and the axis of rotation A. Specifically, the helicoidal angle γ is measured between the axis of rotation A and a plane that is perpendicular to the shortest line between any given point on the cutting edge 8 and the axis A (i.e. a plane perpendicular to the radius of the milling bit 12).

Each cutting tooth 5 has a corresponding flute 6 parallel to the trajectory of the cutting edge 8 and extending along the length of the working sector 2. The flute 6 is formed immediately after the trailing (rear non-cutting) edge 9 of each cutting tooth 5 with respect to the direction of rotation. The shape, the cross-section and size of the flutes 6 provide sufficient space for easy chip formation and removal without compromising the structural strength of the teeth. In a transvers section the shape of the flutes 6 is an optimized and smooth curve in the space between the cutting teeth 5, without sharp corners, in order to avoid stress concentration in the tool and chip retention conditions. The transverse profile of the flute 6 can be variable along the length of the tool, for example to be deeper or shallower, in order to provide greater strength or rigidity of the tool in the corresponding area.

The working sector 2 consists of a cutting anterior part 3, which is a part of a sphere, and a cutting posterior part 4 fixed to the shank 1, which is a transition between the shank 1 and the spherical anterior part 3. When the tool is rotated, the cutting edges 8 at the posterior part 4 geometrically describe a revolved surface in the form of a cylinder, cone, paraboloid, hyperboloid, or a combination of the above and ending with the spherical anterior part 3.

There may be one or more cutting teeth 5, and accordingly, one or more cutting edges 8. More cutting edges 8 may cause a higher cutting speed because there is less material to trim by one cutting edge 8. On the other hand, more edges means reducing the size of the flutes, and thus the space for the release of the chips in operation. This could lead to accumulation of shavings, fusion and clutter. Therefore, a number of cutting edges between one and five may be optimal. More narrowly, there are no more than three cutting teeth 5.

Figure 2:
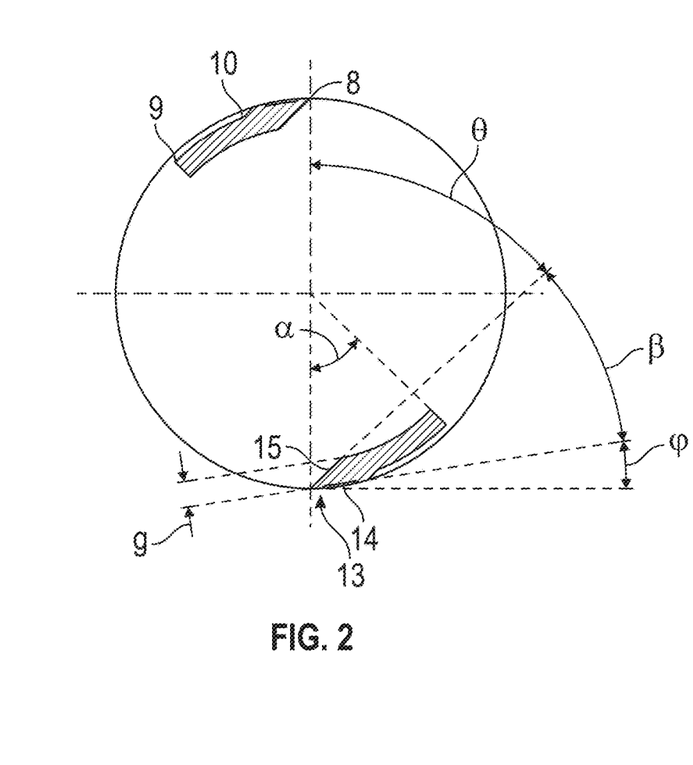
FIG. 2 presents an enlarged cross-section in the Equatorial plane of the spherical anterior part 3 of the working sector 2 of the milling bit 12 from FIG. 1. In this disclosure the Equatorial plane refers to a plane perpendicular to the rotational axis A of the milling bit. The figure shows the formation of the angular width α, the negative radial indentation 10 of the cutting tooth and the wedge angle β. It also shows relief angle φ and rake angle θ.

The forward part of the cutting 5 tooth of the milling bit 12 (FIG. 2) is formed as a straight or curved cutting wedge 13 (cutting blade) with a wedge angle β. Wedge angle β is defined between an outer deflecting surface 14 and a cutting face 15 of the cutting tooth 5. Increasing the sharpness of the cutting wedge 13 by decreasing the angle β of the wedge 13 diminishes deformation in the cut off layer, and reduces cutting forces and generated heat. On the other hand, as the wedge angle β decreases, the section of the cutting blade 13 is weakened, which leads to reduction of its strength. Therefore, the sharpness of the wedge 13 should be such as to ensure minimum cutting force with sufficient strength of the tool. This is achieved by selecting the appropriate geometric parameters of the cutting blade 13. The wedge 13 of the cutting tooth has three basic dimensions: length, width (or thickness) g, and depth, as the first two form a section area (FIG. 2). Cutting resistance is determined primarily by the total section area of the milling bit 12 actively engaged in contact with the clay and the wedge angle β enclosed between deflecting surfaces 14/15 of the cutting blade 13. The ideal theoretical situation would be at zero thickness g of the cutting blade 5 and a wedge angle β equal to zero (extremely sharp wedges), which would mean the absence of a second dimension of the cutting blade 13. In practical terms, this is unrealizable due to the inability to maintain the cutting edge without adequate thickness g, i.e. material structure. Accordingly, in an example, the thickness g is between 0.3-5 mm and the wedge angle β is between 3°-40° at the anterior end of the cutting tooth 5. These ranges minimize cutting resistance while providing sufficient strength to the cutting blade.

The relief angle φ is the angle enclosed between the outer deflecting surface 14 of the cutting tooth 5 and the motion vector of the cutting edge 13, which is tangent to the circle defined by the cutting edge 8 during rotation. In an example, the relief angle φ can have values from 0° up to about 5°. Providing the relief angle φ in this range serves to reduce the parasitic friction between the outer part of the cutting edge 13 and the material being machined.

A rake angle (θ on FIG. 2) is defined between the cutting face 15 and a plane normal to the cutting edge's motion vector. Providing the wedge angle β and outer angle φ in the ranges noted above results in high positive values of the rake angle θ, in one example between 45° and 87°. In the case of revolving tools, the normal is the radius of the motion circle. There are three types of rake angles: positive, zero or neutral, and negative. The positive rake angle means that the tool is sharper and pointed. However, this reduces the strength of the tool, and at a small wedge angle β the cutting edge 8 may chip away when used on more resilient materials, but could work with great benefits on materials with higher softness like industrial clay. Such benefits are reduction of the cutting forces, decrease of the temperature in the work zone and a cleaner cut. Thus, the disclosed rake angles θ will create a better quality machined surface faster.

Another improvement of the embodiments of this disclosure relates to facilitating the evacuation of chips by means of a spherical cavity 16 at the anterior part 3 of the working sector 2 and cavities along entire cutting sector 2 in some embodiments. The degree of reduction of the cutting tooth's blade section and deflecting angles depends on the milling bit's architecture and manufacturing technology.

In one example, the anterior part 3 of the working sector 2 is hollow. Accordingly, an anterior cavity 16 is formed by the inner surface of the tooth 5 or teeth and extends at least in the anterior part 3, but can also continue to the posterior part 4. The flutes 6 transit into the anterior cavity 16 and together form the drainage space for the chips.

In the embodiments with one cutting edge 5 shown in the FIGS. 3 and 4 and described in more detail below, the entire working sector 2 is hollow, and the flute 6 merges with the anterior cavity 16.

The shape of the anterior cavity 16 can be spherical, spheroidal, ellipsoidal, ovoid, cylindrical or other similar revolved shape or a combination thereof. Physically, the anterior cutting part 3 of the working sector 2 is a hollow sphere or a hemisphere reduced to one or more identical spherical shell elements 7 corresponding to the cutting teeth 5. Shell elements 7 are spherical segments of the theoretical sphere of the anterior part 3. The cutting edge 8 in the shell element 7 is a continuation of the projection of the helicoid forming the cutting edge 8 along its entire length.

The thickness of the shell segments 7 may be 0.3-5 mm, and must meet the minimum strength parameters permitted by the implemented material and production technology. This allows a reduction in the thickness of the cutting teeth 5 at the anterior part and, accordingly, decrease in resistance. The shell elements 7 of the cutting teeth 5 in the anterior part 3, as spherical segments, may have different angular widths a depending on the number of teeth 5. The angular width α of the shell elements 7 is the angle between the end points of the cutting edge 8 and the trailing edge 9 of the shell element 7 and the center of the theoretical sphere of the anterior part 3, measured at the Equatorial plane of this imaginary sphere (FIG. 2). Said another way, the angular width α is defined as the angle between respective planes extending from the central rotational axis A to the end points of the cutting edge and trailing edge 9 of the shell element edge 7. 8

With an angular width α between 90° and 180°, an additional through hole 11 can be provided on the surface of the shell element 7 for better evacuation of chips (shavings). The additional hole 11 may be perpendicular to the axis of rotation A of the milling bit 12.

The angular width α of the shell element 7 is important for the structural strength of the milling bit 12 and particularly to the spherical anterior part 3 of the working sector 2. An angular width α in the range of 100°-180° gives good strength to the shell element 7 (anterior cutting spherical segment), but may reduce the evacuation of chips. This range is practically applicable when implemented with one anterior spherical shell element 7. An angular width α in the range of 10°-90° gives a good release of chips, but may result in a single cutting tooth being relatively structurally weak.

Accordingly, in one example, a milling bit 12 has one tooth 5 and the shell element 7 has an angular arc width α between about 45°-190°, or more narrowly about 60°-180° degrees. In another example, a milling bit 12 has two cutting teeth 5 and shell elements 7 having angular arc widths a between 8°-90°. In another example, a milling bit 12 has three identical cutting teeth 5 rotationally symmetrical to the central axis A of the milling bit 12, and their shell elements 7 have an angular arc width α between 8°-45°. Reducing the angular width α of the spherical shells 7 of the cutting teeth 5 also reduces the cutting resistance. This also facilitates the evacuation of chips.

When there are two or more cutting teeth 5, they are rotationally symmetrical relative to the axis of rotation A of the tool, and accordingly, at equal peripheral distances from each other to ensure a uniform load on the tool body. For the same reason, the flutes 6 between the cutting teeth of the tool have the same size and shape, which ensures an equal distribution of chips.

The diameter of the spherical anterior part 3 can be the same as the diameter of the posterior part (inscribed diameter) or could exceed the diameter of the posterior part 4.

In the embodiments of the invention shown in the figures where the diameter of the anterior part 3 is the same as the diameter of the posterior part 4 (FIGS. 3-7), the shape of the anterior part 3 is a hemisphere. Expressed geometrically, it is a union between a cylinder or other revolved geometric figure and a sphere of the same diameter. When the diameter of the anterior part 3 is greater than the diameter of the posterior part 4 (FIGS. 1-2 and 8-13), then the shape of the anterior part 3 is a portion of a sphere larger than a hemisphere. Expressed geometrically, it is a union between a cylinder or other revolved geometric figure and a sphere of different diameters, the sphere being larger.

The outmost diameter of the milling bit's anterior part 3, according to the invention, can be from 2.5 mm to about 100 mm. The theoretical maximum size of the milling bit 12 is not limited, but in practical terms, the size will be determined by the overall dimensions and details of the milled model. Larger cutters will have higher productivity. Too small milling bits will have reduced efficiency. Milling bits of a large diameter (15-60 mm) will cut material faster than milling bits of a small diameter (2.5-15 mm), so the largest diameter that can do the task is preferred. When milling a concave shape (cavity), the diameter of the milling bit will be limited by the size of the internal curves. The radius of a selected milling bit should be equal or smaller than the radius of the smallest negative geometric arc used in the virtual model.

To reduce the parasitic friction between the outer surface of the tool and the milling material, a negative radial indentation 10 may be provided on the outer surface of the cutting tooth 5 behind and along the cutting edge 8 (FIG. 2).

This disclosure illustrates several nonlimiting embodiments divided in two main groups: milling bits 12 with inscribed hemispherical ends (FIGS. 3-7) and milling bits with enlarged spherical ends (FIGS. 1-2 and 8-13).

Figure 3:
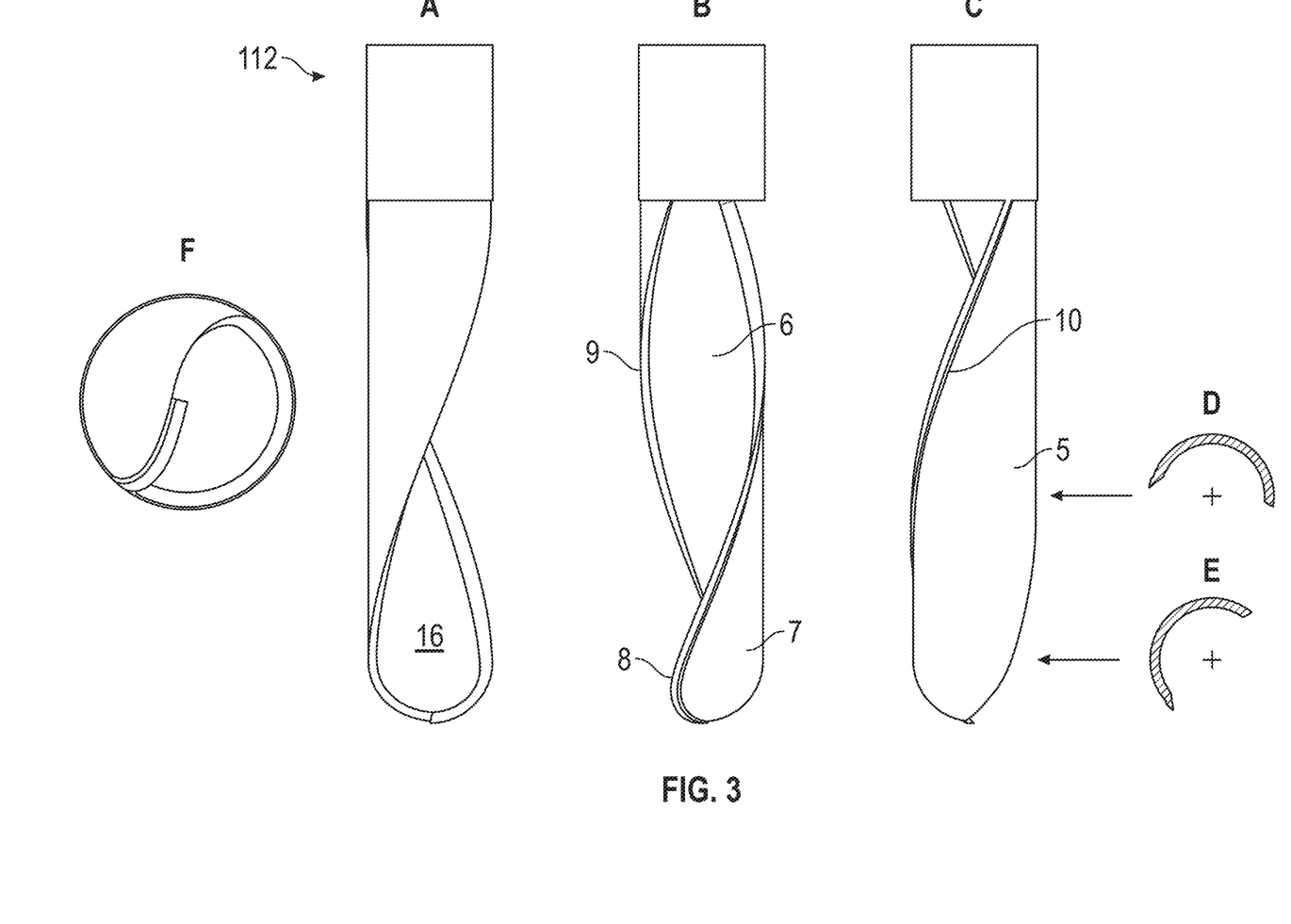
FIG. 3 presents an example milling bit 112 with a single cutting tooth with an inscribed anterior spherical part, in which the angular width of the spherical shell is about 180°.
Figure 4:
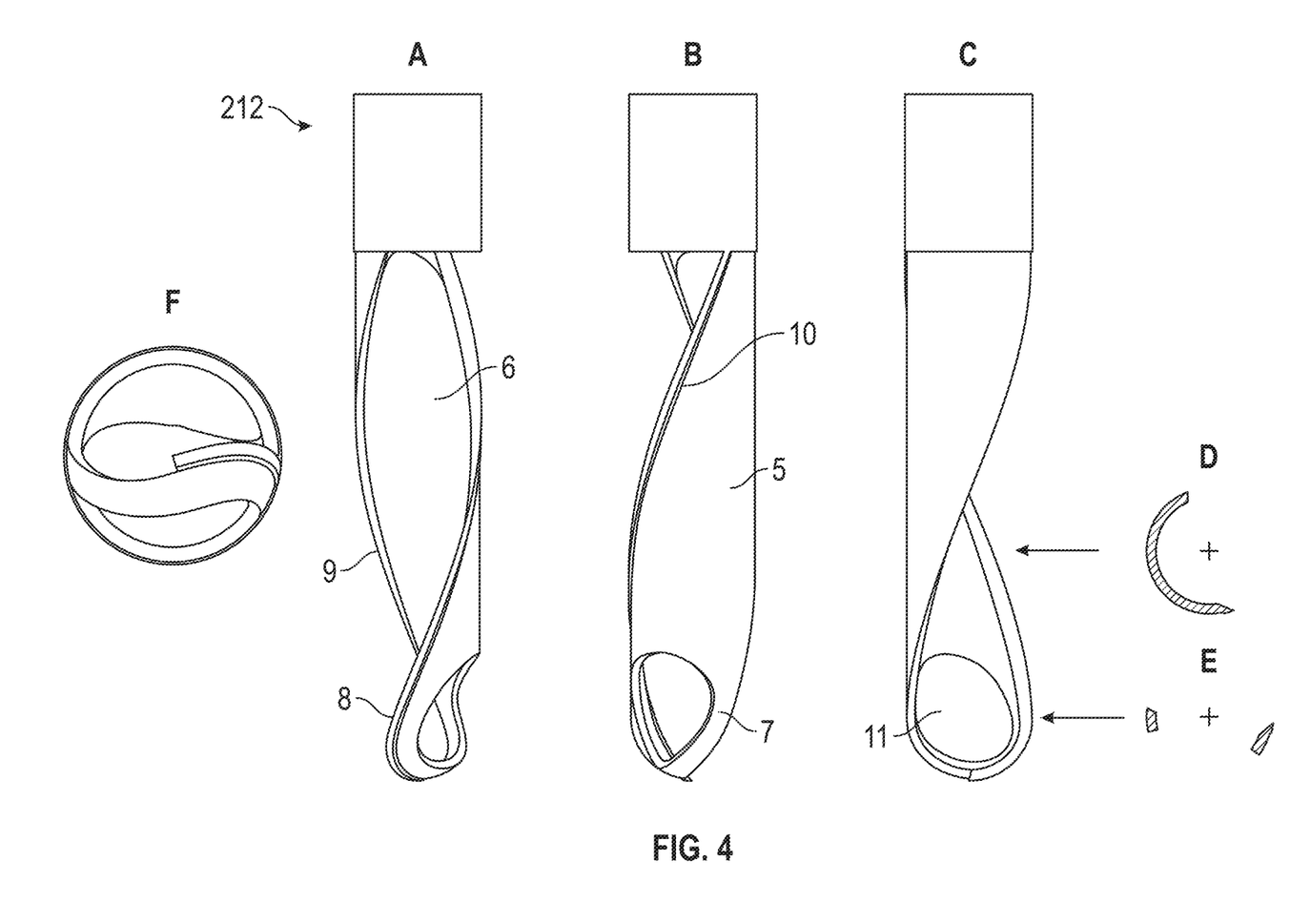
FIG. 4 presents an example milling bit 212, which is a modification of the milling bit from FIG. 3, wherein there is a through hole in the spherical shell element.

FIG. 3 shows an example milling bit 112 with an inscribed hemispherical end and with a single cutting edge 5. In this disclosure, like reference numerals designate like elements where appropriate and reference numerals with the addition of intervals of one-hundred designated modified elements that are understood to incorporate the same features and benefits of the corresponding elements. The posterior part 4 has the shape of a cylinder and has the same diameter as the hemispherical anterior part 3 of the working sector 2. The angular width α of the arc in the Equatorial plane of the cutting spherical shell 7 is in the order of about 180°. FIG. 4 shows an example drilling bit 212, which is a modification of the example in FIG. 3, wherein the spherical shell is provided with a hole 11 that communicates with the anterior cavity 16 and contributes to better chip removal and prevention of accumulation of material in the anterior part 3 of the working sector 2.

Figure 5:
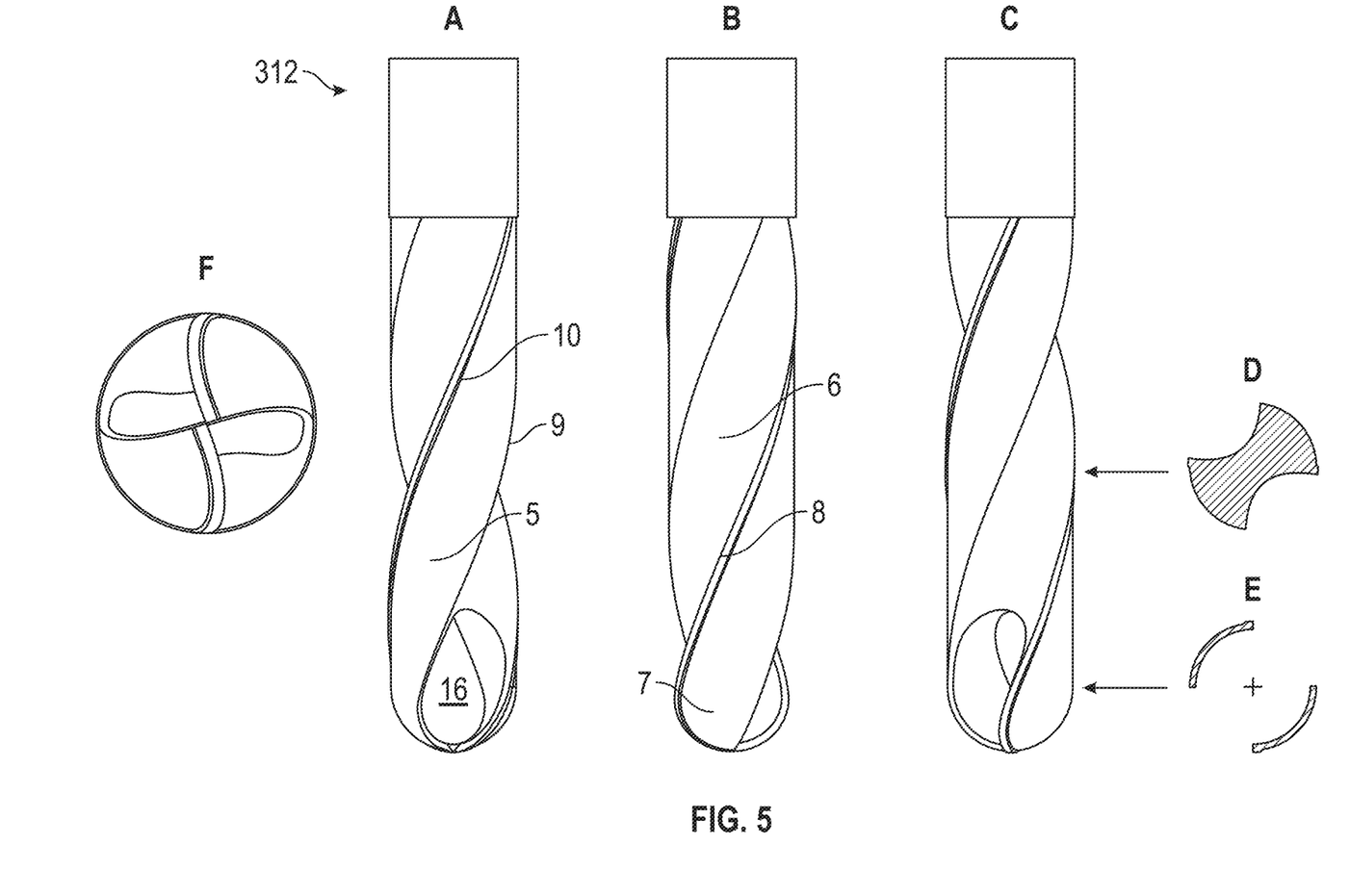
FIG. 5 presents an example milling bit 312 with two cutting teeth with an inscribed anterior spherical part, in which the angular width of the spherical shells is about 90°.
Figure 6:
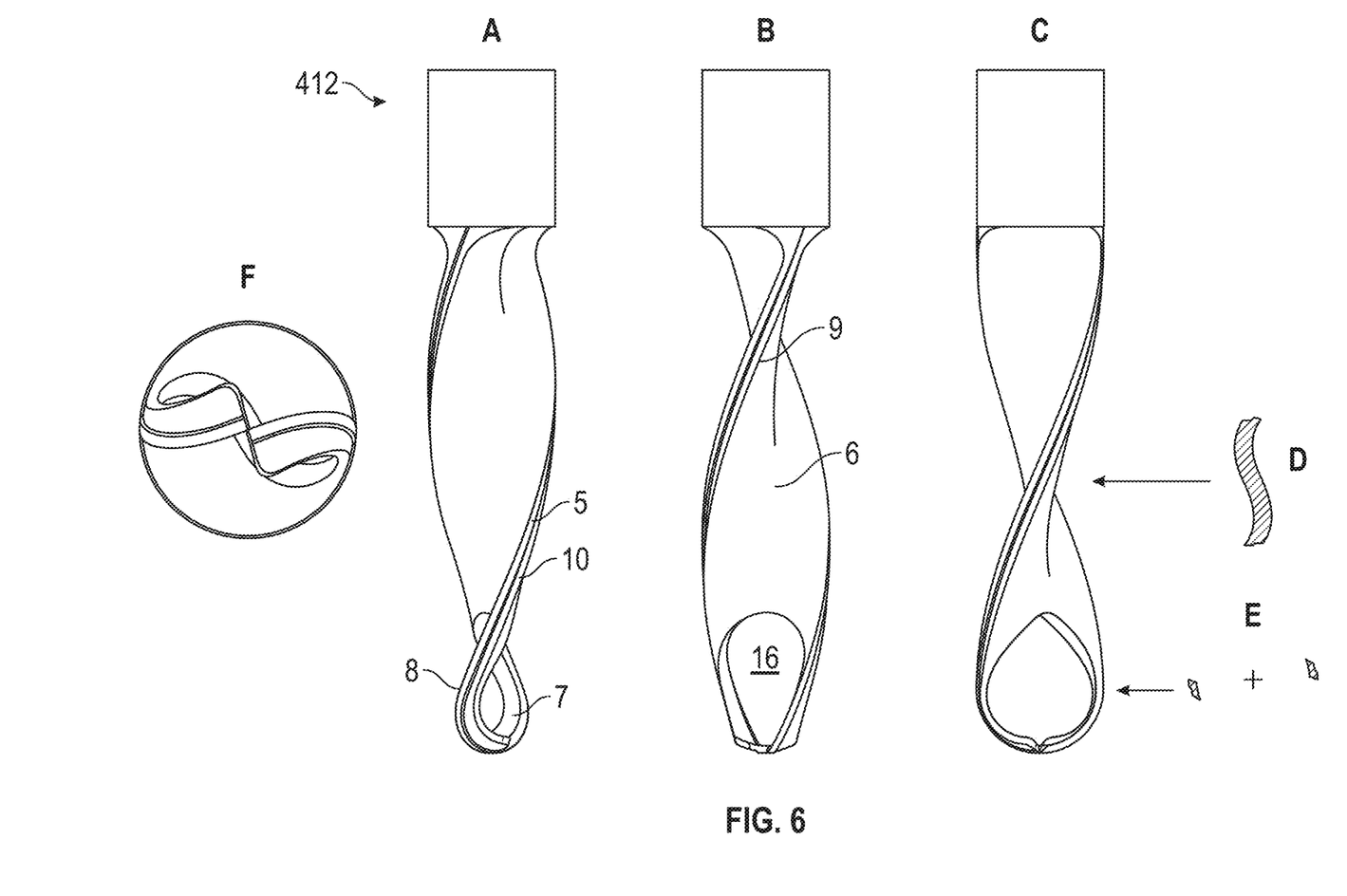
FIG. 6 presents an example milling bit 412 with two cutting teeth with an inscribed spherical anterior part, in which the angular width of the shells is about 18°.

FIG. 5 shows an example milling bit 312 with an inscribed hemispherical end and with two cutting teeth 5. The posterior part 4 is cylinder-shaped and has the same diameter as the hemispherical anterior part 3 of the working sector 2. In the example of FIG. 5 the angular width a of the arc in the Equatorial plane of the cutting spherical shell elements 7 is about 90°. The anterior cavity 16 is oval in shape and also extends to the posterior part 4 of the working sector 2. FIG. 6 shows an example milling bit 412, which is a modification of the example in FIG. 5, wherein the angular width α is about 18°, and the flutes 6 are shallow and flattened.

Figure 7:
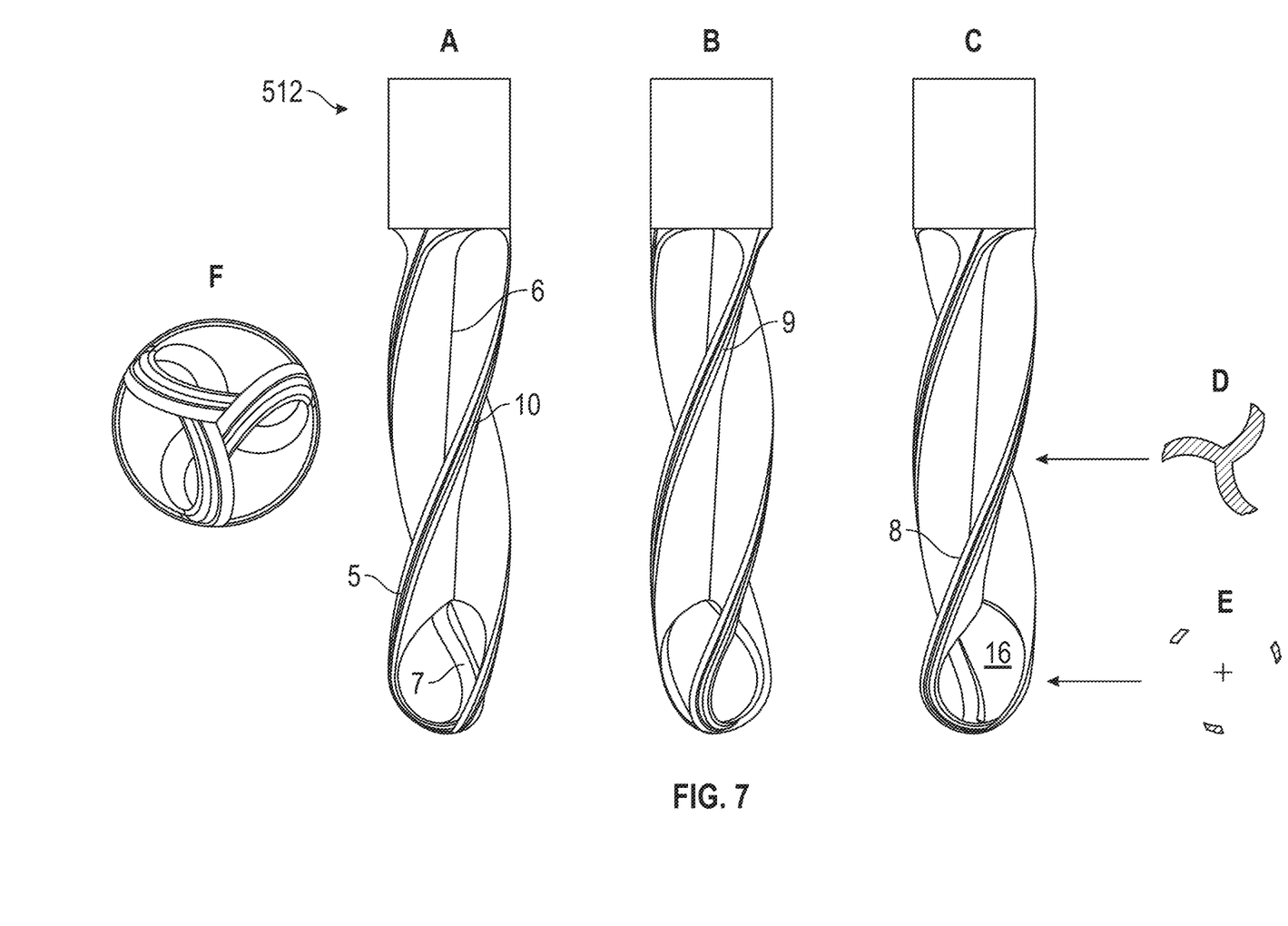
FIG. 7 presents an example milling bit 512 with three cutting teeth with an inscribed spherical anterior part, in which the angular width of the shells is about 16°.

FIG. 7 shows an example milling bit 512 with an inscribed hemispherical end with three cutting teeth 5. The posterior part 4 is cylinder-shaped and has the same diameter as the hemispherical anterior part 3 of the working sector 2. In the example shown in FIG. 7, the angular width of the arc a is about 16°.

FIGS. 1-2 and 8-13 show example milling bits with enlarged spherical ends. The ratio between the diameter of the posterior part 4 and the diameter of the anterior spherical part 3 of the cutting sector 2 for these examples may be less than about 1:3.

Figure 8:
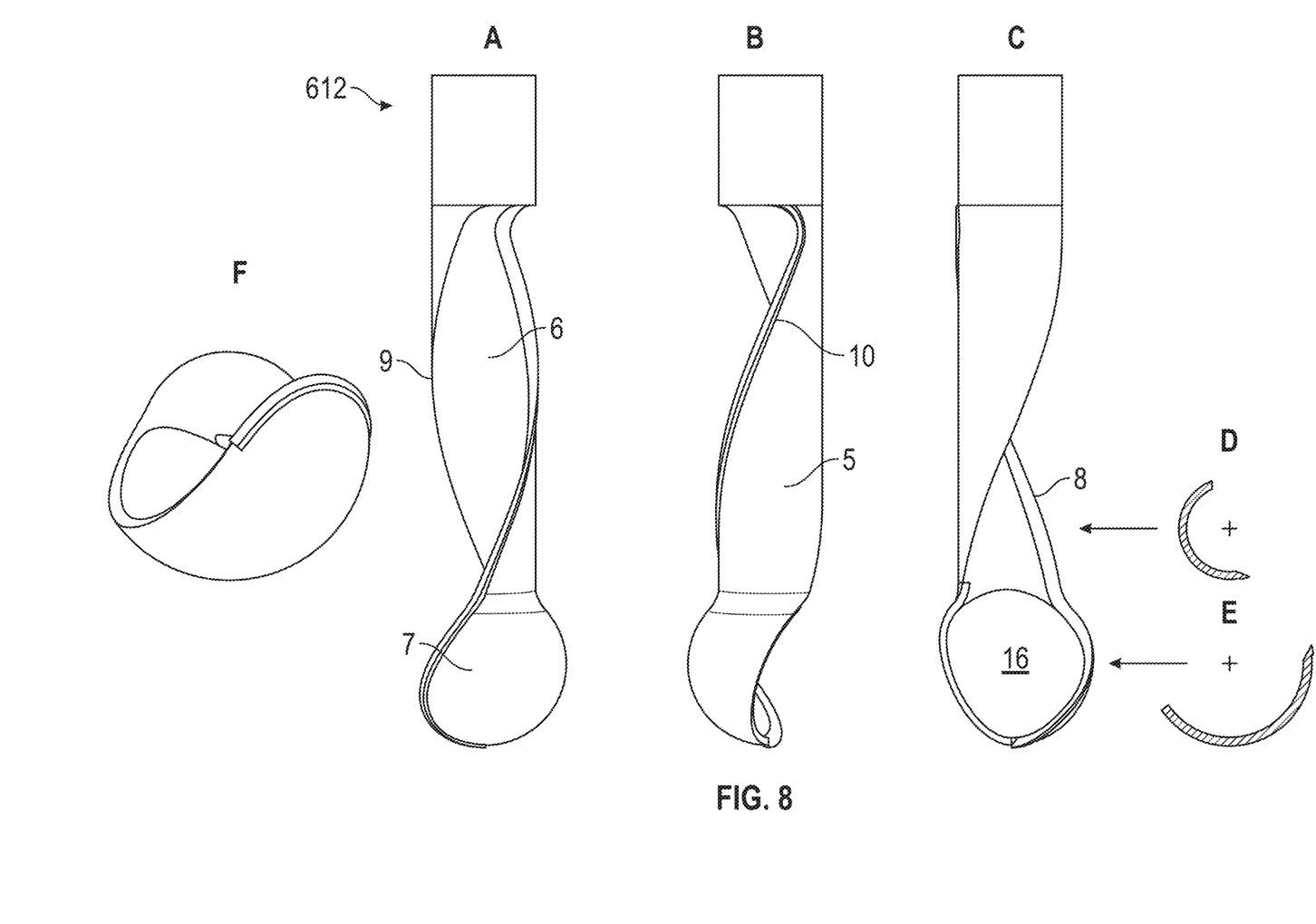
FIG. 8 presents an example milling bit 612 with a single cutting tooth with an exceeding anterior spherical part, in which the angular width of the spherical shell around 180°.
Figure 9:
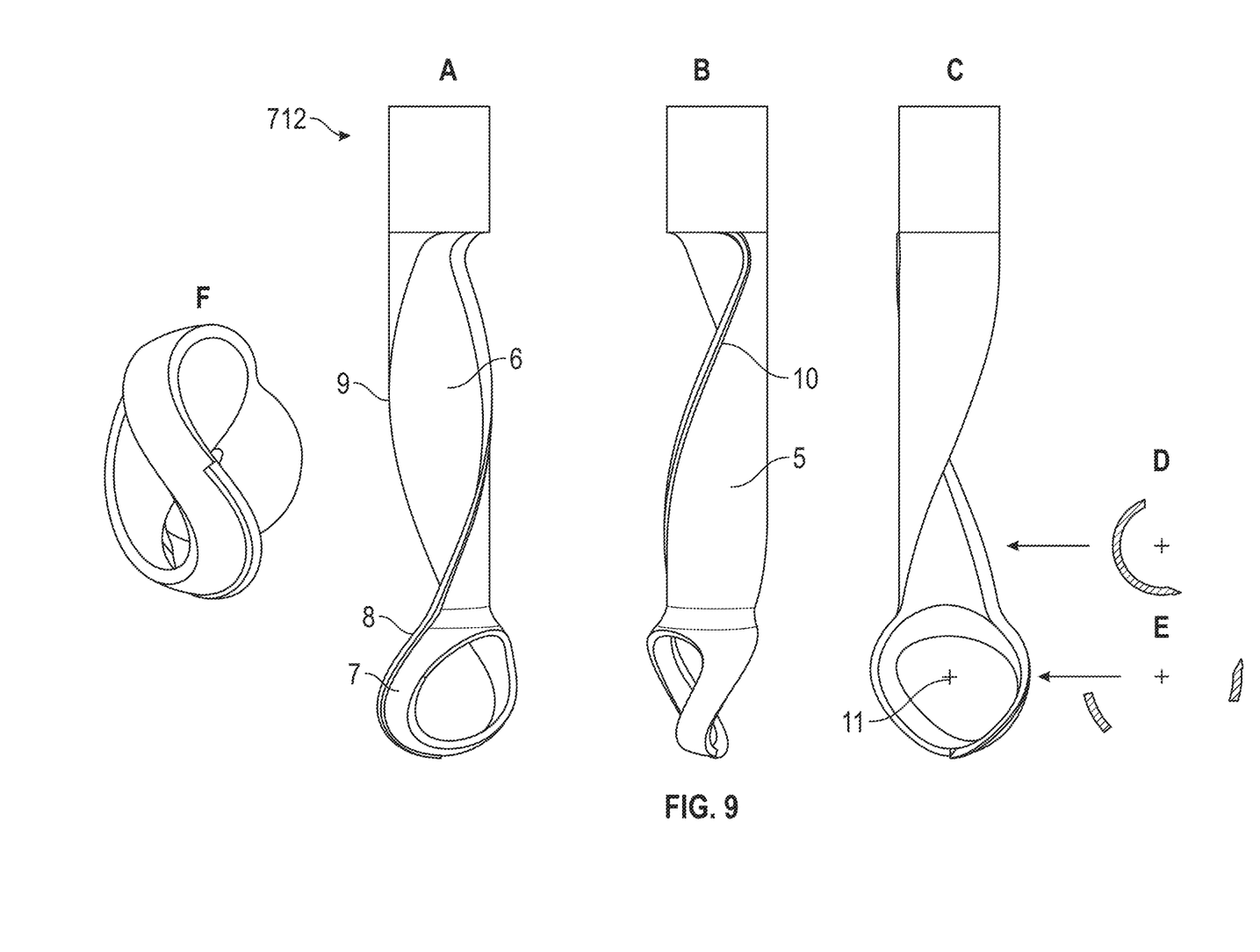
FIG. 9 presents an example milling bit 712, which is a modification of the embodiment from FIG. 8, with an additional through hole in the spherical shell.

FIG. 8 shows an example milling bit 612 with an enlarged spherical end and one cutting tooth 5. Spherical anterior part 3 has a larger diameter than the posterior part 4 of the working sector, which is cylindrical. The angular width α of the arc in the Equatorial plane of the cutting spherical shell 7 is about 180°. FIG. 9 shows another example milling bit 712 with an enlarged spherical anterior part 3 and one cutting tooth in which the spherical shell 7 has an additional through hole 11 that communicates with the anterior cavity 16 and contributes to better chip removal and prevention of material accumulation in the anterior part 3.

Figure 10:
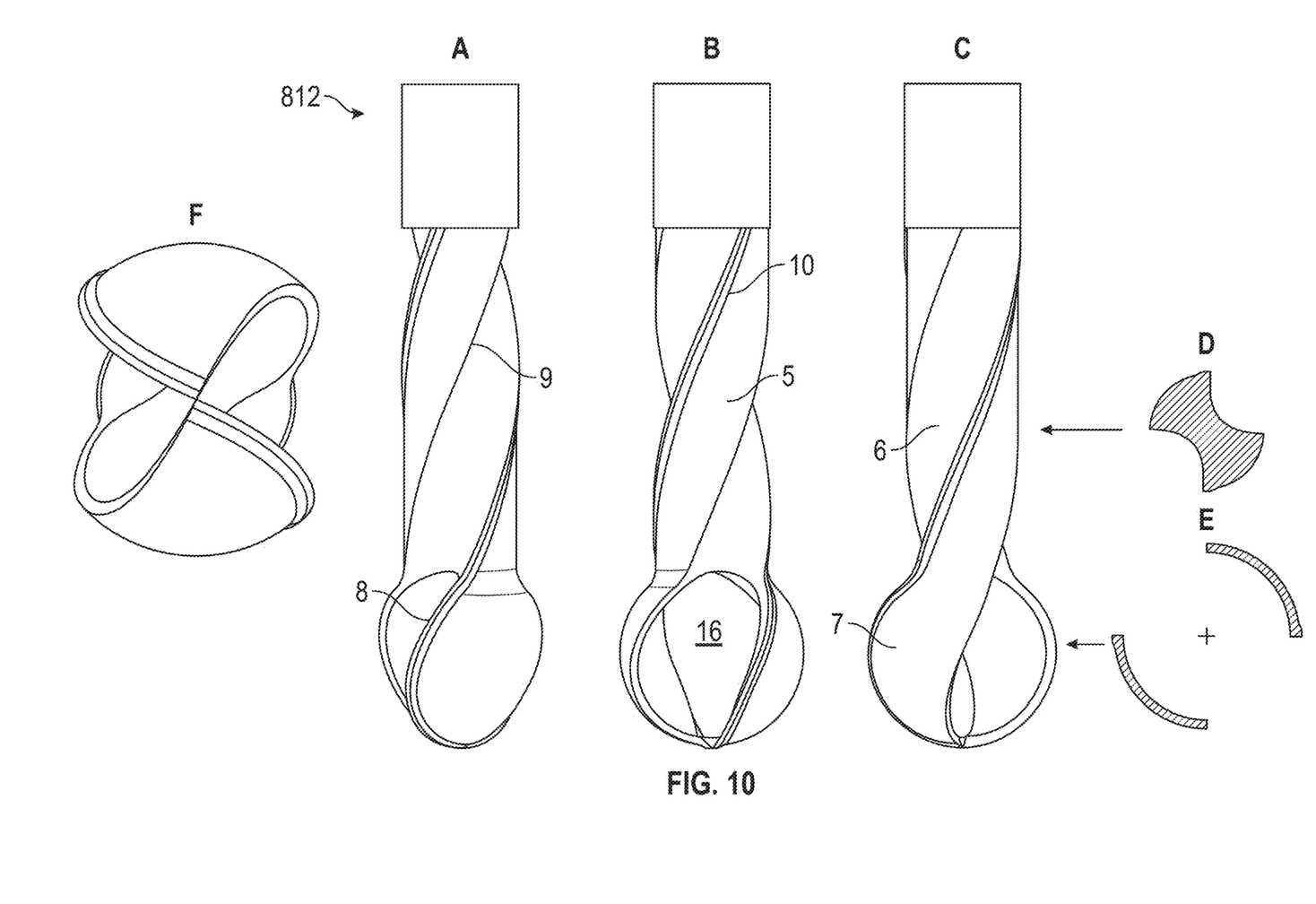
FIG. 10 presents an example milling bit 812 with two cutting teeth with an exceeding spherical anterior part, in which the angular width of the spherical shells is about 90°.
Figure 11:
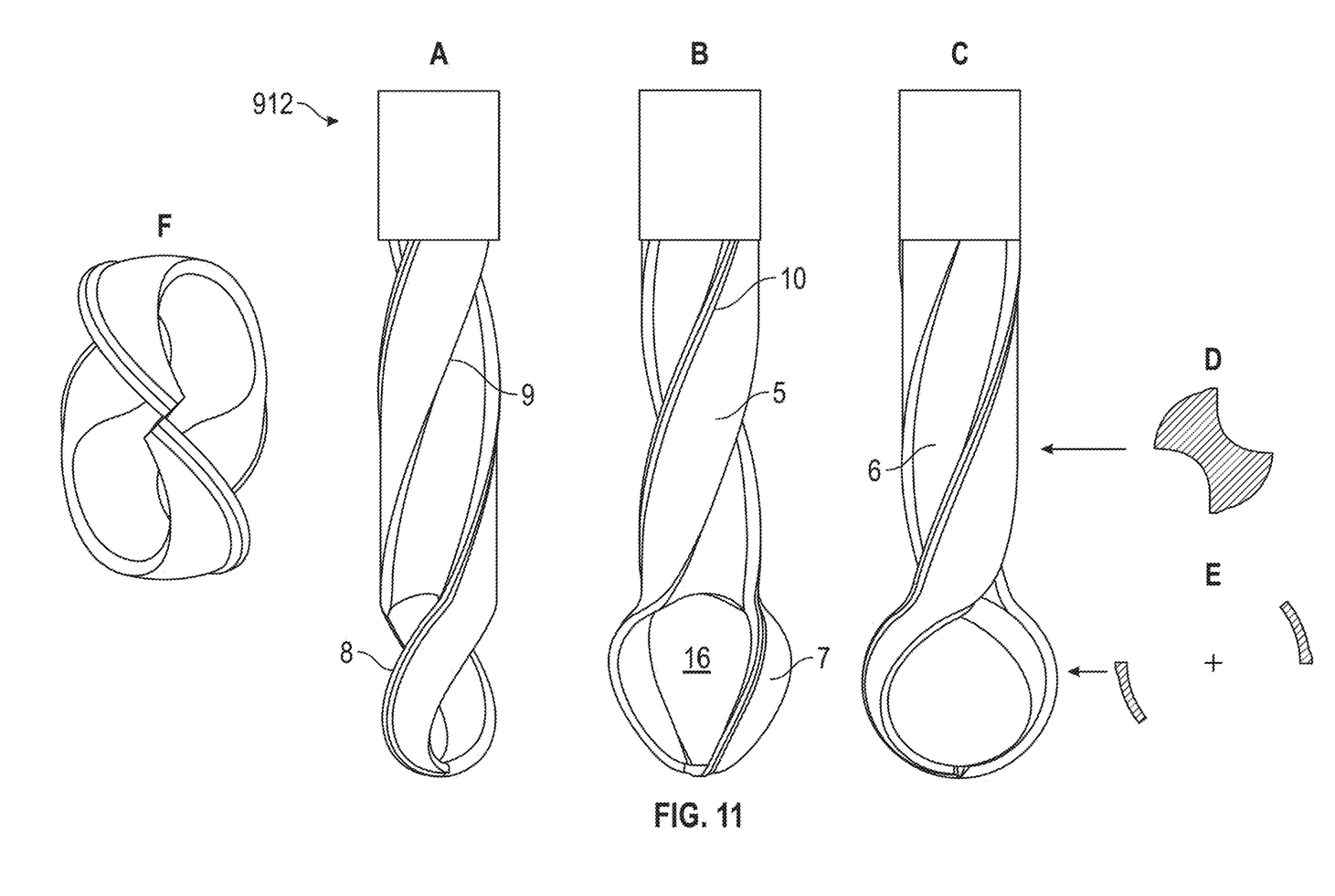
FIG. 11 presents an example milling bit 912, which is a modification of the embodiment from FIG. 10, with an angular width of spherical shells about 38°.

FIG. 10 shows an example milling bit 812 with an enlarged spherical end and two cutting teeth 5. The spherical anterior part 3 has larger diameter than the posterior part 4 of the working sector, which is cylindrical in shape. The angular width α of the cutting spherical shell elements 7 is about 90° in the example of FIG. 10. FIG. 11 shows another example milling bit 912 with an enlarged spherical end and two cutting teeth 5 wherein the angular width α is about 38°.

Figure 12:
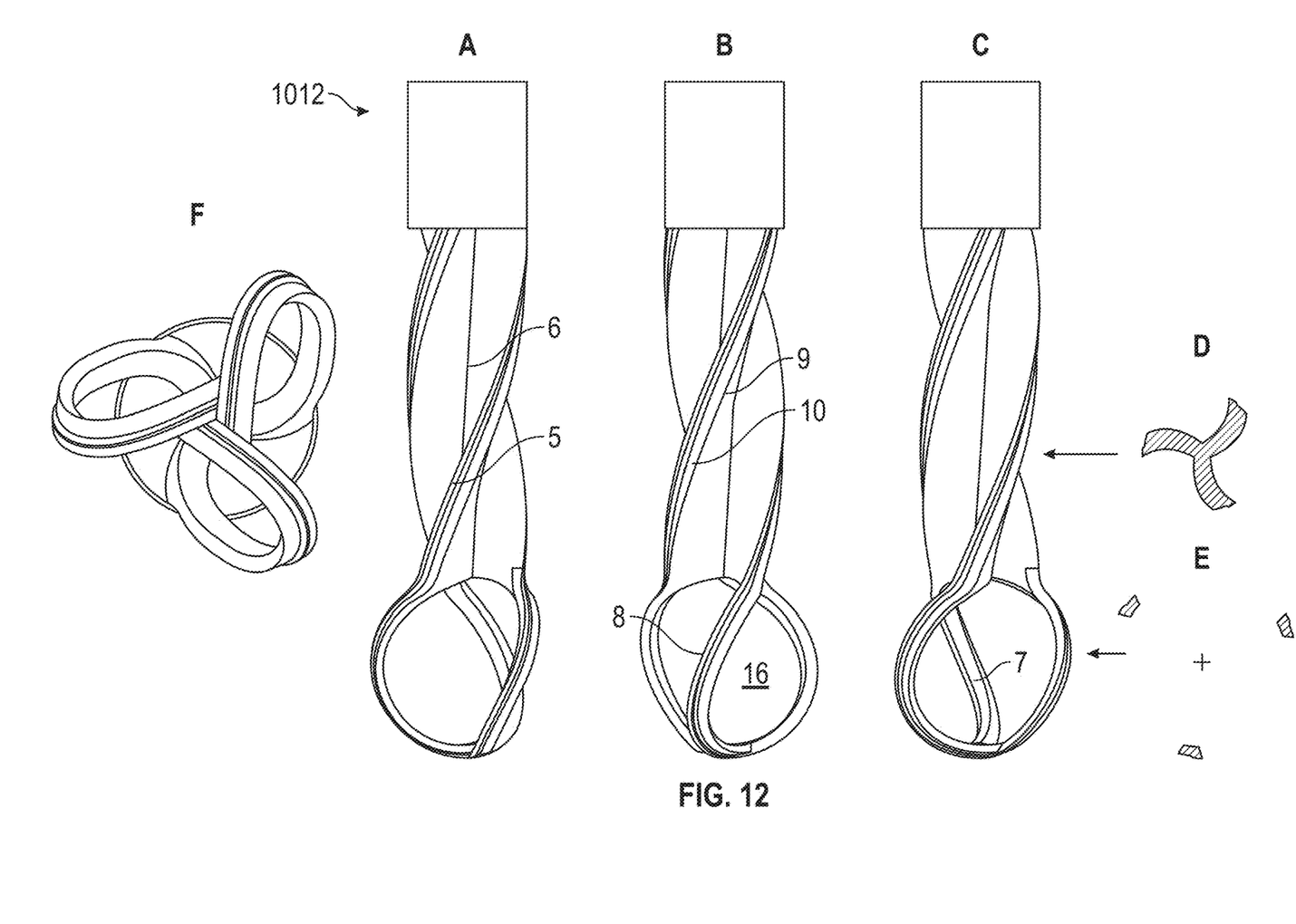
FIG. 12 presents an example milling bit 1012 with three cutting teeth with an exceeding spherical anterior part, in which the angular width of the spherical shells is about 14°.

FIG. 12 shows an example milling bit 1012 with an enlarged spherical end and three cutting teeth 5. The spherical anterior part 3 has a larger diameter than the posterior part 4 of the working sector 2, which is cylindrical in shape. The angular arc width α of the cutting spherical shell elements 7 is about 14°.

Figure 13:
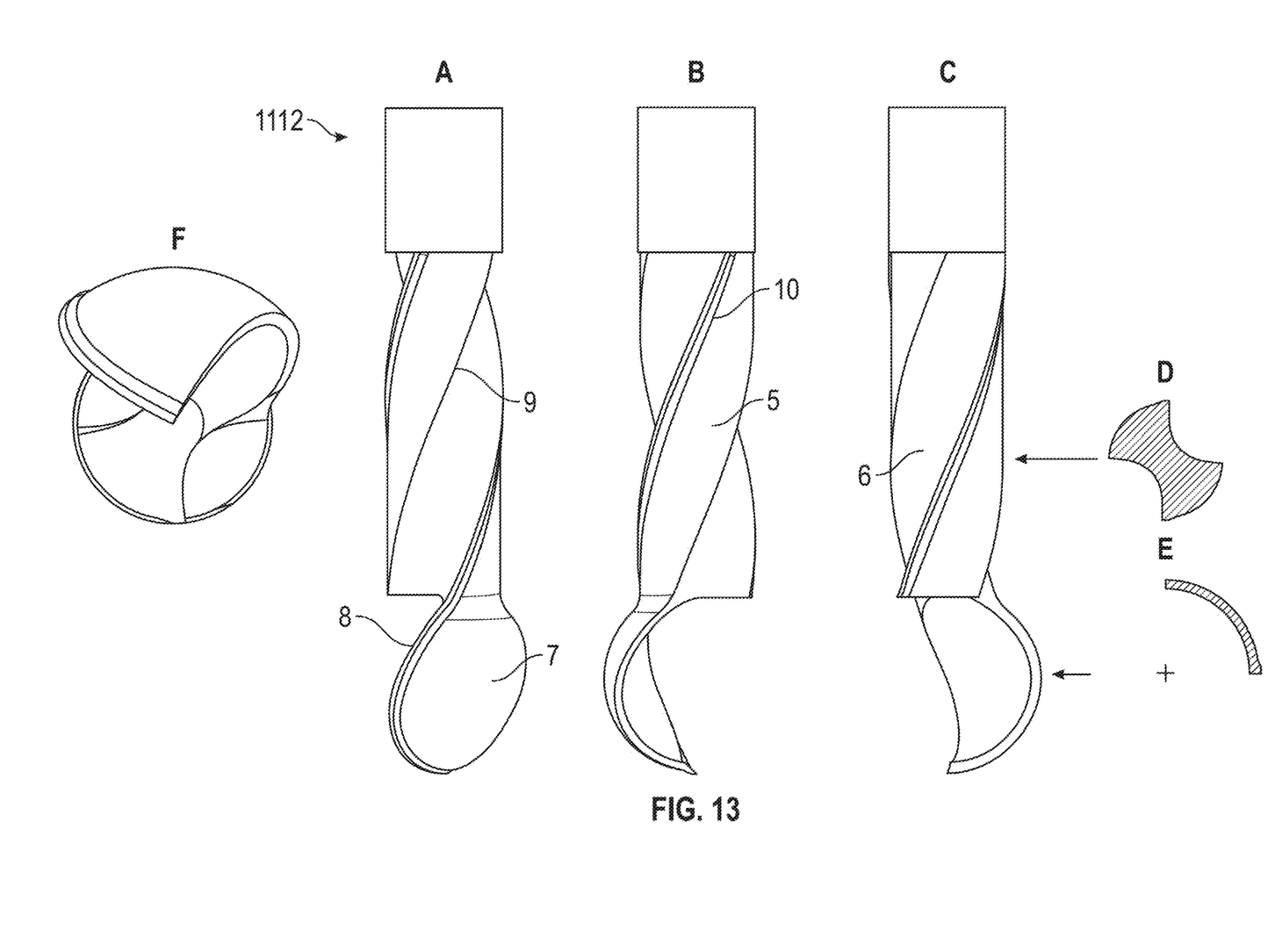
FIG. 13 presents a combined embodiment milling bit 1112 with two cutting teeth at the posterior part of the working sector and one spherical shell element in the anterior part of the working sector, in which the angular width of the shell element is about 90°.

FIG. 13 shows an example milling bit 1112 in which the posterior part 4 of the working sector 2 has two or more cutting teeth 5, but only one of them transit in the form of a spherical shell element 7 in the anterior part 3 of the working sector 2. The example shown in FIG. 13 has two cutting teeth 5 at the posterior part 4 and one cutting spherical shell element 7 at the anterior part 3 with an angular arc width α of about 90°.

The milling bits according to this disclosure can be manufactured in one piece, composite and assembled. The exemplary milling bits can also be made of one or more mechanically connected or welded elements in accordance with the production technology. The milling bits can be made of materials such as a tool steel and include wear-resistant inserts made of high-strength and hard synthetic materials. It is desirable that the surface of the tool is polished and coated with a nonsticking layer.

After fixation in the chuck of the mill, the milling bit starts turning, and after reaching the operational revolutions, it enters the clay and is driven linearly along a pre-generated trajectory. The milling bit follows the linear trajectory via the theoretical center of the spherical anterior part. The combination of rotational and translational movement of the tool in the material creates a cutting action. The process is subtractive, and as a result of the cutting action, the material is systematically cut off in the form of a channel with a section identical to the contour of the figure described by the cutting edges when the tool is rotated around the axis of rotation. The clay model surface is thus formed by multiple parallel, overlapping and connected channels and cavities, whether shallow or deep, machined by the milling bit.

Although the different non-limiting embodiments are illustrates as having specific components or steps, the embodiments of this disclosure are not limited to those particular combinations. It is possible to use some of the components or features from any of the non-limiting embodiments in combination with features or components from any of the other non-limiting embodiments. In other words, placement and orientation of the various components of the embodiments of FIGS. 1-13 could vary within the scope of this disclosure. In addition, the various figures accompanying this disclosure are not necessarily drawn to scale, and some features may be exaggerated or minimized to emphasize certain details of a particular component.

It should be understood that like reference numerals identify corresponding or similar elements through the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A milling bit comprising:
   a shank; and
   a working sector extending from the shank to an anterior end of the milling bit, the working sector including:
   a cutting anterior part with an outer surface defined by a reference sphere,
   a cutting posterior part fixed to the shank and located between the shank and the cutting anterior part,
   a cutting tooth including a continuous cutting edge extending the entire length of the working sector, wherein the cutting edge is helicoidal about a central axis of the milling bit and is defined by a helicoidal angle γ between 10° and 45°, and
   a helical flute extending along the length of at least the cutting posterior part of the working sector adjacent to the cutting edge;
   wherein an open anterior cavity is formed by an inner surface of the cutting anterior part such that, in a region of the anterior cavity, the cutting tooth is in the form of a spherical shell element with a wall thickness between 0.3 mm to 5 mm and the cutting tooth includes a wedge angle β between 3° and 40°; and
   wherein the cutting posterior part includes a hollow channel defined about the central axis, the hollow channel comprising a cylindrically-shaped space void of material, the hollow channel being in communication with the anterior cavity, and the helical flute extending about the hollow channel and defining the outer diameter of said cylindrically-shaped space void of material.

2. The milling bit according to claim 1, wherein the spherical shell element in the cutting anterior part includes a positive rake angle θ of between 45° and 87°, the rake angle θ defined between a cutting face of the cutting edge and a plane normal to a motion vector of the cutting edge when the milling bit rotates about the central axis.

3. The milling bit according to claim 1, wherein, when the milling bit is rotated around the central axis, the continuous cutting edge of the cutting tooth at the cutting posterior part circumscribes a reference cylindrical shape.

4. The milling bit according to claim 1, wherein the anterior cavity defines a spherical shape.

5. The milling bit according to claim 1, wherein a maximum diameter of the cutting anterior part is the same as a maximum diameter of the cutting posterior part, wherein the cutting anterior part is defined by a hemisphere.

6. The milling bit according to claim 1, wherein a maximum diameter of the cutting anterior part is larger than a maximum diameter of the cutting posterior part.

7. The milling bit according to claim 1,
wherein the cutting tooth is the only cutting tooth at the cutting anterior part of the working sector, and the spherical shell element is defined by an angular arc width α in the equatorial plane of between 45° and 190°.

8. The milling bit according to claim 7, wherein the angular width α in the equatorial plane of the spherical shell element is between 90° and 180° and a through hole is provided in the spherical shell element.

9. The milling bit according to claim 7, wherein the angular width α in the equatorial plane of the spherical shell element is between 60° and 180°.

10. The milling bit according to claim 7, wherein the wherein the helical flute merges with the anterior cavity.

11. The milling bit according to claim 1, wherein the cutting edge of the cutting tooth includes a helicoidal angle γ of between 20° and 35°.

12. The milling bit according to claim 1, wherein the hollow channel extends the entire length of the cutting posterior part.

13. The milling bit according to claim 12, wherein the spherical shell element includes a through hole in communication with the anterior cavity and the hollow channel.

14. The milling bit according to claim 1, wherein the spherical shell element in the cutting anterior part includes a relief angle φ between 0° and 5°, the relief angle φ defined between an outer deflecting surface of the cutting tooth and a plane tangent to the reference sphere at the cutting edge.

15. The milling bit according to claim 1, wherein a radial indentation is provided on an outer surface of the cutting tooth.

16. The milling bit according to claim 1, wherein the helical flute extends to the anterior cavity such that the helical flute, the hollow channel, and the anterior cavity form a drainage space.

17. The milling bit according to claim 1, wherein the spherical shell element includes a cutting face, wherein a reference line extending from the cutting face and extending normal to the cutting face extends in a direction including a radially inward vector component relative to the central axis.

* * * * *